United States Patent [19]

Sugiura et al.

[11] 4,417,796
[45] Nov. 29, 1983

[54] SINGLE LENS REFLEX CAMERA BODY

[75] Inventors: Yoji Sugiura, Yokohama; Toshio Hagiwara, Kawasaki; Toru Okumura, Yokohama; Syunichi Nakahara, Tokyo, all of Japan

[73] Assignee: Canon Kabushiki Kaisha, Japan

[21] Appl. No.: 318,159

[22] Filed: Nov. 4, 1981

[30] Foreign Application Priority Data

| Nov. 6, 1980 | [JP] | Japan | 55-156316 |
| Nov. 6, 1980 | [JP] | Japan | 55-156317 |
| Nov. 6, 1980 | [JP] | Japan | 55-156318 |

[51] Int. Cl.³ .................. G03B 17/02; G03B 19/12
[52] U.S. Cl. ................................ 354/152; 354/288
[58] Field of Search ........................ 354/152–158, 354/288

[56] References Cited

U.S. PATENT DOCUMENTS

| 4,067,032 | 1/1978 | Yoshikawa et al. | 354/288 |
| 4,079,396 | 3/1978 | Iura et al. | 354/288 X |
| 4,152,065 | 5/1979 | Kobori | 354/288 |
| 4,257,697 | 3/1981 | Yamazaki et al. | 354/288 X |

FOREIGN PATENT DOCUMENTS 54-25725  2/1979  Japan .................................... 354/288

Primary Examiner—John Gonzales
Attorney, Agent, or Firm—Toren, McGeady and Stanger

[57] ABSTRACT

A mirror box formed of metal serves as a metallic portion constituting together with a plastic portion an essential part for imparting strength characteristics to a camera body. The metallic portion is provided with a base for a lens mount and with similar parts for assembling other element. During molding, some of the metallic segments of the lens mount base are inserted as a framework into the plastic portion so that the metallic and plastic portions are constructed in the form of a unit. This unit is then assembled with other portions as the base unit of the essential part to complete a single lens reflex camera body.

10 Claims, 15 Drawing Figures

F I G.12
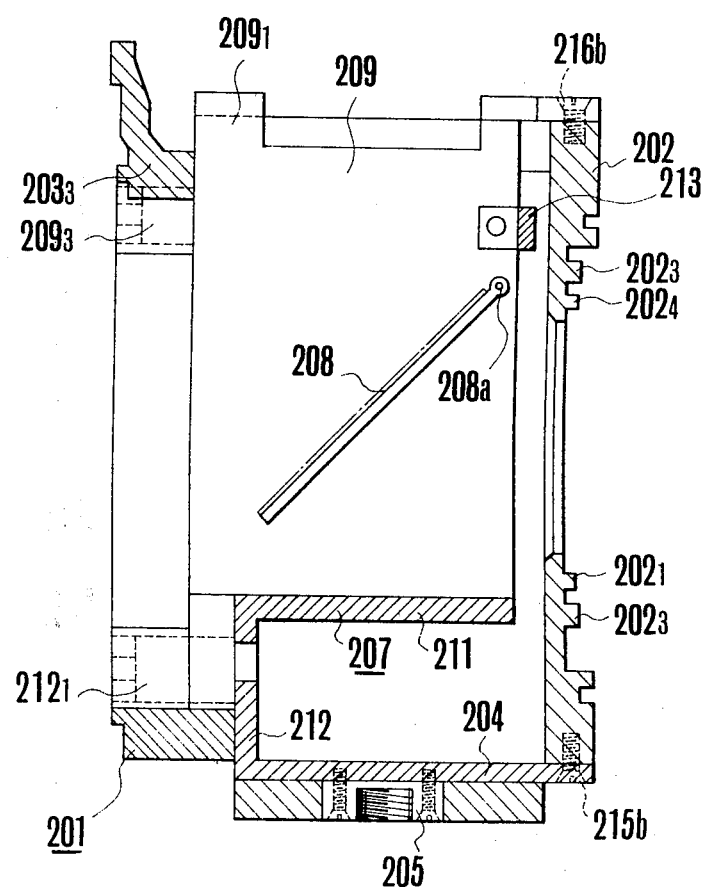

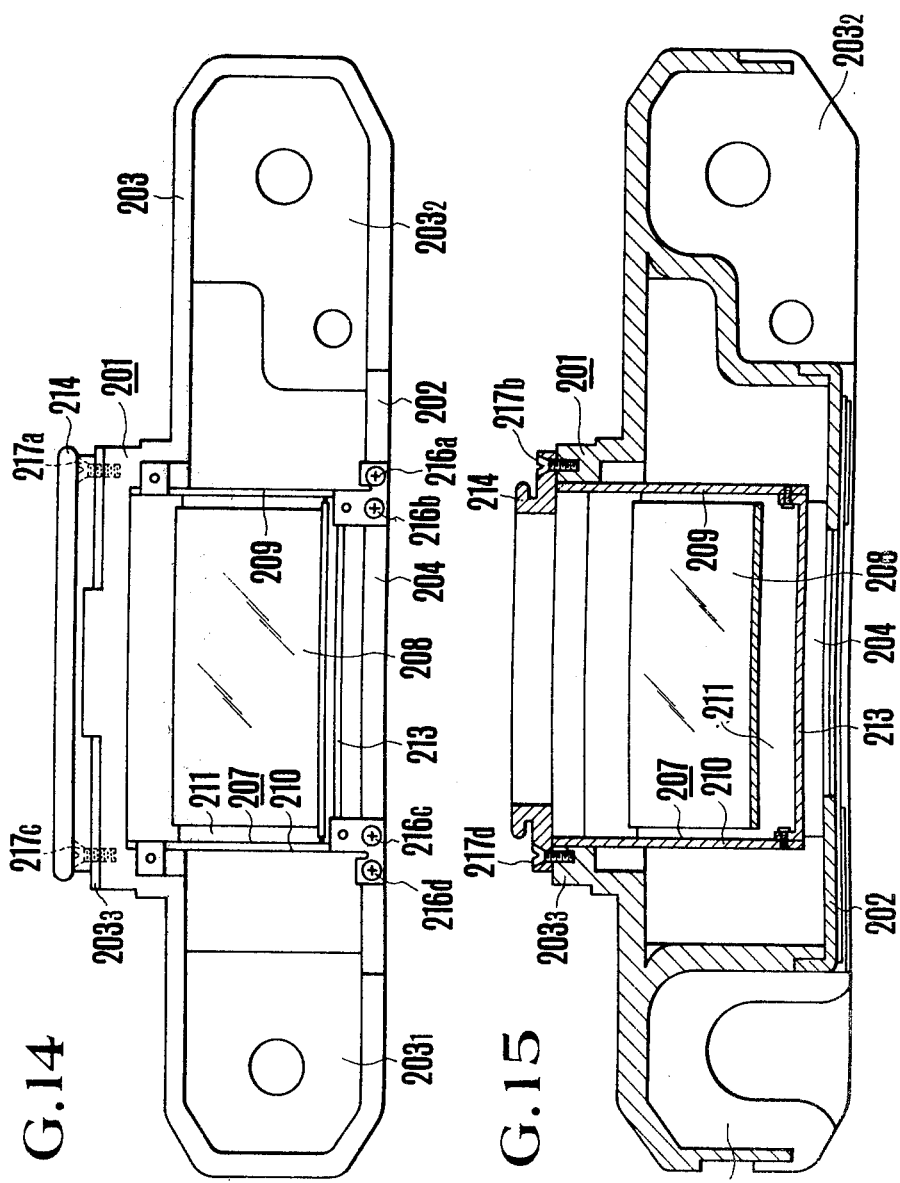

SINGLE LENS REFLEX CAMERA BODY

BACKGROUND OF THE INVENTION

1. Field of the Invention

This invention relates to single lens reflex camera bodies, and more particularly to the use of plastic in such a body.

2. Description of the Prior Art

In general, camera bodies which are formed from the viewpoint of providing high precision accuracy and rigidity will make use of light alloy castings such as those made with aluminum. The manufacturing of such die-cast camera bodies usually involves a great number of machining steps, and is therefore very time-consuming and laborious, causing such items to be necessarily expensive.

Therefore, in the art of moderately priced cameras (generally of the lens shutter type) which do not demand such high precision accuracy, the use of plastics in the bodies has been given consideration. At the present time, due to the great advance in plastic technology, as far as moderately priced camera bodies are concerned, sufficient precision accuracy and rigidity is achieved only by the use of plastics.

On the other hand, even in the art of single lens reflex cameras, since reduction of the weight and lowering of the production cost are desired objectives, the use of plastics in the camera body has also been given consideration. However, in single lens reflex cameras which require high precision accuracy, the presently developed state of plastic techniques has not yet reached a level which will assure sufficient precision accuracy when used in the body of the single lens reflex camera. If the camera body were made of plastics, problems would arise in that there would be a high possibility of occurrence of accidents due to the insufficient strength of the body and due to deformation thereof with variation of the ambient temperature.

For this reason, recent use of plastics in the single lens reflex camera has involved provision of means for assuring at least the precision accuracy of the so-called flange back, or distance from the mount surface of the attachment base for the photographic objective lens to the film guide rail. Such means have involved use of a metal block having a portion in which are formed an aperture for defining the film frame size and film guide rails and a bottom wall portion having tripod screw-threads which is inserted into and seated in between the plastic-molded takeup spool and cartridge chambers of the camera body. The device is then assembled with a front panel of metal having a lens mount to complete the body of the single lens reflex camera.

Since the front panel of the single lens reflex camera is usually provided with the mirror box, according to the prior art, the lens mount attachment base and the wings are formed as an aluminum die-cast member, while the mirror box is also formed separately as an aluminum die-cast member, and then both the castings are assembled to form the front panel. This two-casting form of front panel, however, necessitates not only assembly line operators, but also a secondary machining step during assembly, and an additional finishing step for assurance of the required precision accuracy.

On this account, attempts have been made to form the lens mount attachment base, the wings and mirror box as a single aluminum die-casting. But this single-casting form of front panel also necessitates the additional finishing step for assurance of the required precision accuracy.

Therefore, recently, the mirror box has been made up of metal by pressing means, while the lens mount attachment base and the wings are formed as a zinc die-casting, and then both the units are assembled with each other to form a front panel. This new two-unit form of front panel, because it uses a mirror box of pressed metal enables the size and position of each hole on the mirror box in itself to be determined with high accuracy in machining, and because the lens mount attachment base and wings are made as a zinc die-casting, it enables reduction of the number of additional machining operations.

Although this new front panel having a two-component structure provides advantages, it nevertheless necessitates an assembly operation for formation of the two-component unit. Another disadvantage arising from the use of zinc die-casting is that weight is significantly increased as compared with aluminum die-casting.

It is, therefore, a first object of the present invention to eliminate the above-described drawbacks and to form a lens mount attachment base and wing portions of plastic, while the mirror box is formed of metal, wherein the metal portion and plastic portion constitute a front panel, and wherein said front panel is assembled in a camera body.

A second object of the present invention is to provide a front panel as a portion of the camera body in a plastic-molded unit form.

SUMMARY OF THE INVENTION

Briefly, the present invention may be described as a single lens reflex camera body comprising a first body segment including a metal portion forming a mirror box and a plastic portion formed as one unit with the metal portion. The metal portion includes attachment means for a photo-taking lens and for a second body segment which is attached to the first body segment to form the camera body. The second body segment is formed of plastic with a metal plate inserted in a bottom wall only and with an aperture and defines film cartridge and take-up chambers.

BRIEF DESCRIPTION OF THE DRAWINGS

FIG. 12 is a longitudinal sectional view of the camera body and side wall plate of FIG. 11 when assembled with each other.

FIG. 14 is a top view of the camera body and side wall plate of FIG. 11 when assembled with each other.

FIG. 15 is a lateral sectional view of the camera body and side wall plate of FIG. 11 when assembled with each other.

DESCRIPTION OF THE PREFERRED EMBODIMENTS

A first embodiment of the present invention is next described by reference to FIGS. 1 to 5.

Figure 1:
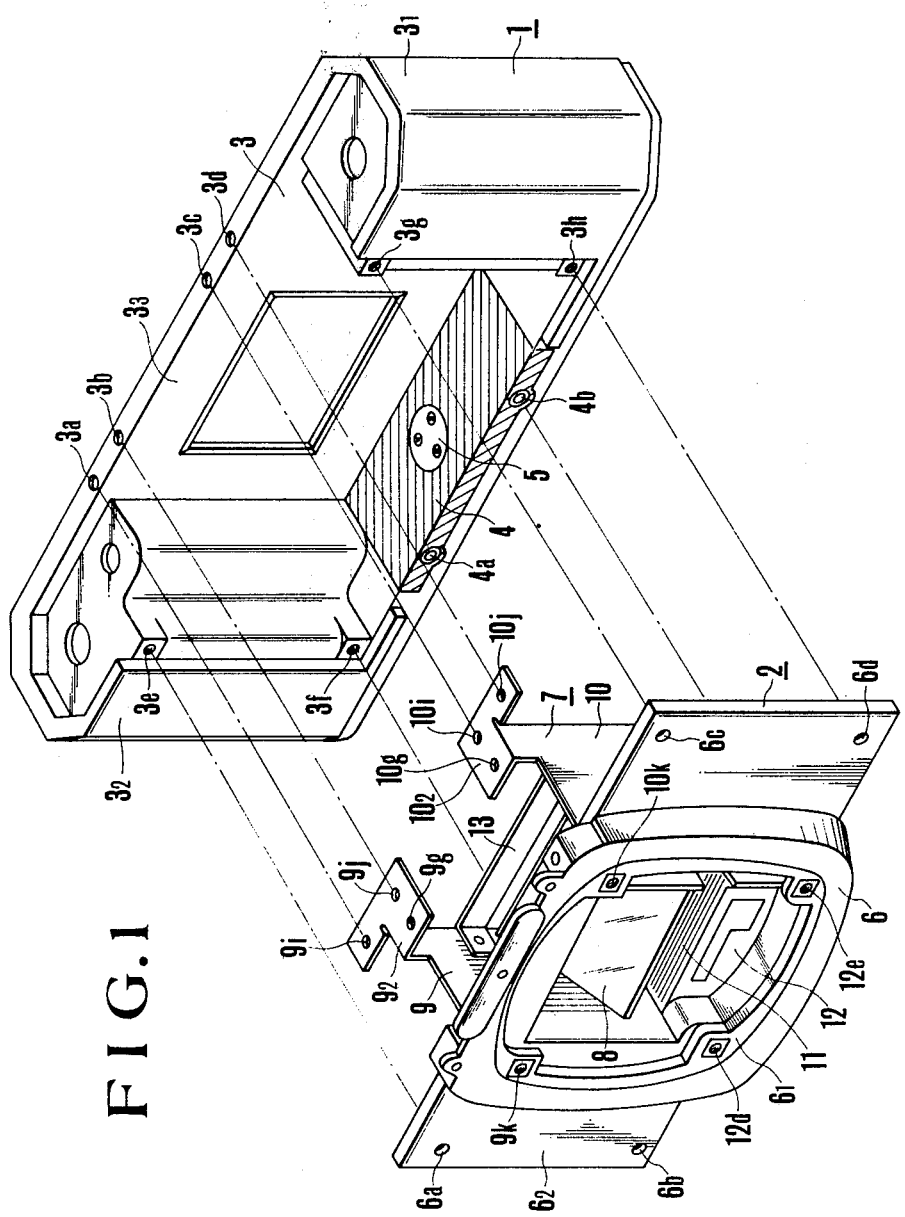
FIG. 1 is an exploded perspective view of a first embodiment of a single lens reflex camera body and a front panel according to the present invention.

FIG. 1 illustrates a single lens reflex camera wherein 1 is a camera body and 2 is a front panel to be attached to the camera body 1. In the camera body 1, 3 is a plastic portion forming the camera body 1, and this plastic portion comprises a film cartridge chamber $3_1$, a film takeup chamber $3_2$ and a side wall $3_3$ provided with an aperture between these chambers 3a, 3b, 3c and 3d are screw-threaded holes for attachment of the front panel; 3e, 3f, 3g and 3h are auxiliary screw-threaded holes for attachment of the front panel; 4 is a metal block inserted into a bottom wall portion between the aforesaid film cartridge $3_1$ chamber and the aforesaid film takeup chamber $3_2$, this metal block 4 being provided with screw-threaded holes 4a and 4b for attachment of the front panel. It is to be noted that this metal block 4 is not entirely buried, but a large proportion of the inner surface is exposed, and a small portion of the outer surface is exposed as illustrated in FIG. 2.

Figure 2:
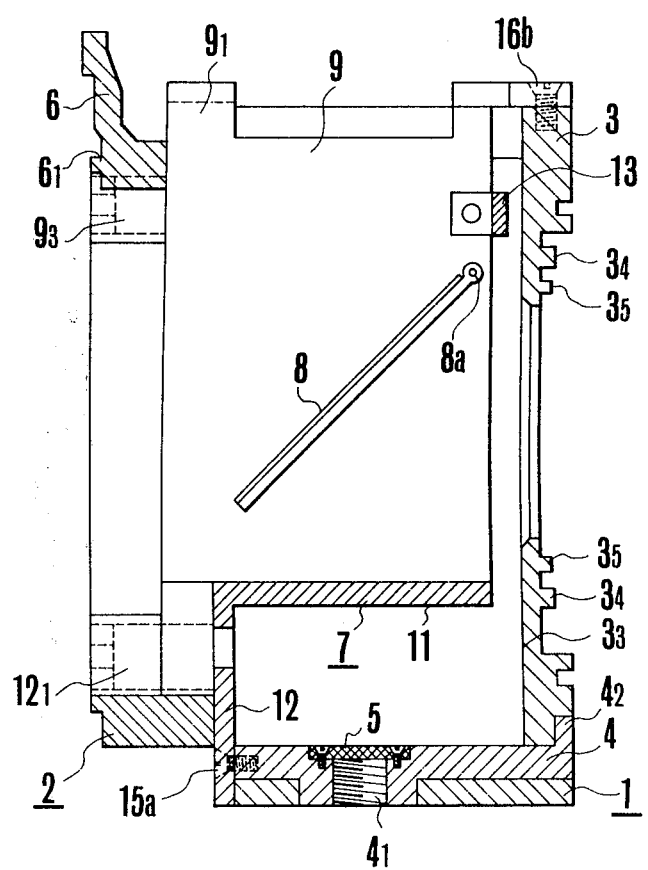
FIG. 2 is a longitudinal sectional view of the camera body and front panel of FIG. 1 assembled with each other.

In this exposed portion of the outer surface of the metal block is bored a tripod attachment screw hole $4_1$ as shown in FIG. 2. This tripod attachment screw hole $4_1$ is in the penetrated form to facilitate the manufacturing of the metal block 4. This penetration hole or screw hole $4_1$ is sealed at the inner end thereof by a cover 5 to prevent projection of the tripod screw into the interior of the camera body.

This cover 5 is attached to the inner face of the metal block 4 by screw fasteners. Also the metal block 4 has a bent portion $4_2$ of short length as shown in FIG. 2 positioned in a portion of the side wall $3_3$ to improve its joinder with the plastic portion 3 and at the same time to increase the strength. The side wall $3_3$ constituting part of the plastic portion 3 has an aperture, and the back surface portion of the side wall $3_3$ is formed to provide outer rails $3_4$ and inner rails $3_5$ as shown in FIG. 2.

Thus, the camera body 1 has the metal block 4 as the base support and is constructed with the metal block 4 and the plastic portion 3 in a single unit form.

Figure 3:
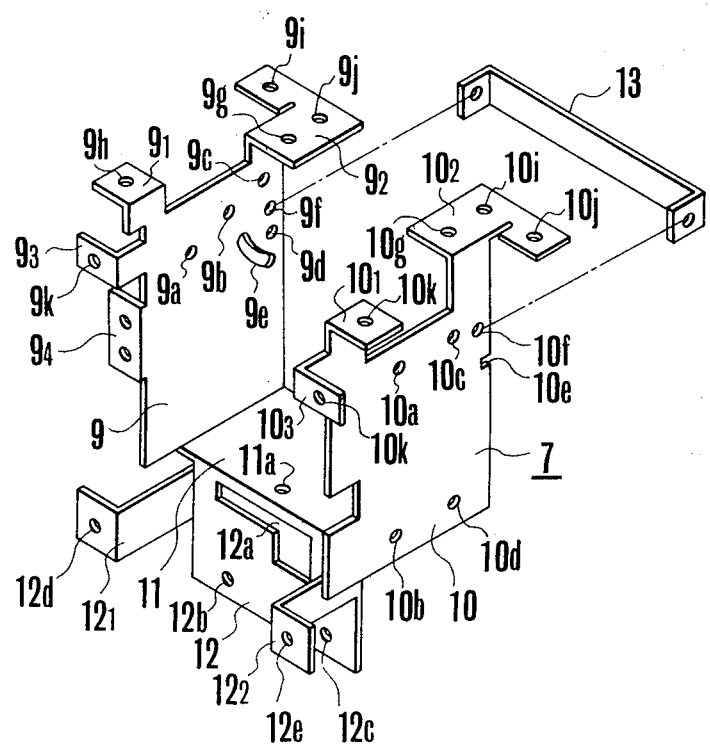
FIG. 3 is a perspective view of the metal portion of the front panel of FIGS. 1 and 2.

In the front panel 2, 6 is a plastic portion forming the front panel 2, and this plastic portion 6 comprises a lens mount attachment base $6_1$ and its surrounding and wings. 6a, 6b, 6c and 6d are auxiliary screw fastener fitted holes for attachment to the camera body 1; 7 is a metal portion forming a mirror box, part of which is inserted into the plastic portion, and which contains a mirror 8. The metal portion 7 is made up from a thin plate of iron or aluminum by pressing means and is constructed as shown in FIG. 3. That is, the metal portion 7 is formed from left and right side panels 9 and 10, a bottom panel 11 and a skirt panel 12 which is downwardly bent from the bottom panel 11. The side panel 9 has holes 9a, 9b and 9c bored therethrough to attach a mirror drive mechanism unit (not shown), and the other side panel 10 has holes 10a, 10b, 10c and 10d bored therethrough to attach an exposure control mechanism unit (not shown). The bottom panel 11 also has a hole 11a bored therethrough to attach an automatic diaphragm mechanism unit (not shown). Again, the side panel 9 is provided with a hole 9d through which a drive shaft 8a for the mirror 8 penetrates and with a guide slot 9e for mirror drive, and the opposite side panel 10 is provided with a cutout portion 10e for mounting the drive shaft 8a of the mirror 8. The left and right side panels 9 and 10 are provided with respective holes 9f and 10f for attachment of a reinforcing plate 13 of metal by rivets. This reinforcing plate 13 makes the metal portion of the mirror box more rigid. Upwardly extending from both of the upper corners of the side panel 9 are projections $9_1$ and $9_2$ of which ends are bent. Also from both of the upper corners of the other side panel 10 are upwardly extending projections $10_1$ and $10_2$ of which ends are likewise bent. These projections $9_1$, $9_2$, $10_1$ and $10_2$ are provided with finder unit screw fastener fitted holes 9g, 9h, 10g and 10h at the bent portions thereof. The bent portions of the projections $9_2$ and $10_2$ are elongated toward the rear, and these elongated portions are provided with screw fastener fitted holes 9i, 9j, 10i and 10j for screw-threaded attachment of it to the camera body 1. These holes 9i, 9j, 10i and 10j are registered to the screw-threaded holes 3a, 3b, 3c and 3d provided in the upper side of the side wall $3_3$ of the camera body 1 respectively. The skirt panel 12 is provided with a cutout portion 12a in which a diaphragm closing down lever (not shown) may operate and with screw fastener fitted holes 12b and 12c for screw-threaded coupling with the camera body 1. These holes 12b and 12c are registered with the screw-threaded holes 4a and 4b in the metal block 4 of the camera body 1 respectively. The sides of the skirt panel 12 also are both provided with forward projections $12_1$ and $12_2$ respectively, of which ends are sidewardly bent. The aforesaid left and right side panels 9 and 10 have respective forward projections $9_3$ and $10_3$ near the aforesaid projections $9_1$ and $10_1$, and these forward projections $9_3$ and $10_3$ are sidewardly bent in the end portions thereof.

Figures 4, 5:
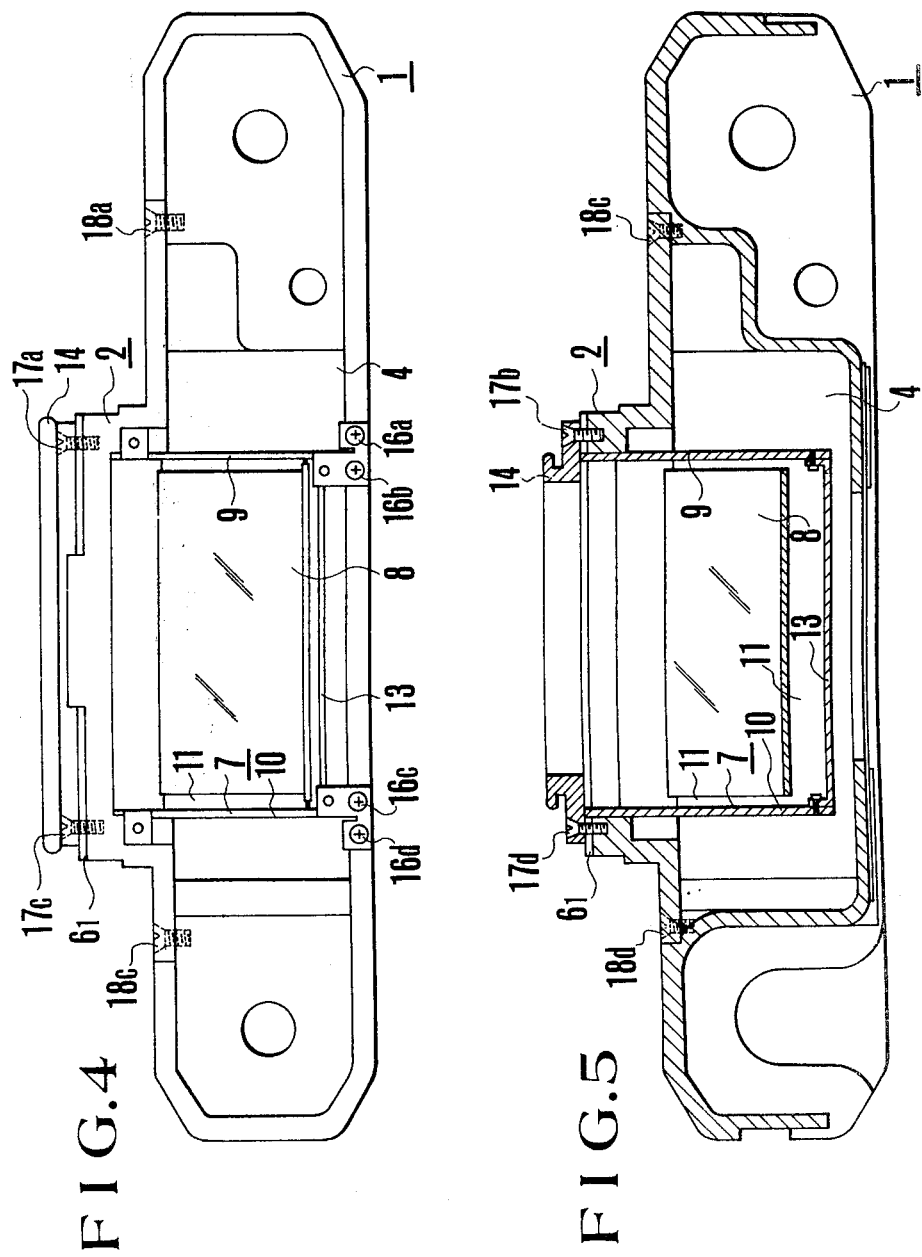
FIG. 4 is a top view of the camera body and front panel of FIG. 1 when assembled with each other.
FIG. 5 is a lateral sectional view of the camera body and front panel of FIG. 1 when assembled with each other.

These bent portions of forward projections $9_3$, $10_3$, $12_1$ and $12_2$ are provided with screw-threaded holes 9k, 10k, 12d and 12e for attachment of a lens mount of metal 14 as shown in FIGS. 4 and 5.

These screw-threaded holes 9k, 10k, 12d and 12e are made to lie in the same plane so that the lens mount 14 is parallel with the film guide plane. The side panel 9 is further provided with a sideward extension $9_4$ which in turn is provided with bored portions to improve adhesion when inserted in the plastic portion 6.

Thus, the front panel 2 is constructed from the metal portion 7 and the plastic portion 6 in a single-unit form with the metal portion 7 serving as the framework.

Now referring to FIG. 2, when attaching the front panel 2 to the camera body 1, the skirt 12 of the front panel 2, is fixedly secured to the metal block 4 of the camera body 1 by screw fasteners 15a and 15b, though only one of these screw fasteners 15a is shown in FIG. 2, and then the side boards 9 and 10 of the front panel 2 are fixedly secured at their projections $9_2$ and $10_2$ to the top of the side walls $3_3$ of the camera body 1 by the screw fasteners 16a, 16b, 16c and 16d.

In FIGS. 4 and 5, there is shown a subassembly of the camera body 1 and the front panel 2. As is clearly illustrated in FIGS. 4 and 5, the mount 14 is fixedly secured to the attachment base $6_1$ by screw fasteners 17a, 17b, 17c and 17d, and the wings $6_2$ of the front panel 2 are fixedly secured to the camera body 1 by screw fasteners 18a, 18b, 18c and 18d.

In the process for manufacturing the subassembly of such construction, and particularly with regard to manufacturing the front panel 2, in order to form the mirror box, a thin aluminum or steel sheet is pressed, boring operations are performed to form holes 9a to 9k, 10a to 10k, 11a and 12a to 12e, an outline punching operation is performed, and bending operations are performed for the panels 9 and 10, the skirt 12, and their projections $9_1$ to $9_4$, $10_1$ to $10_3$, $12_1$ and $12_2$. Then, the mirror box 7 is assembled with the reinforcing plate 13 by alignment of its holes to the respective holes 9f and 10f of the left and right side panels 9 and 10 by caulking or other means such as welding. This will establish a far more rigid structure of the metal portion 7 in the form of a mirror box.

Then, the metal portion 7 of mirror box form is fitted in a metal mold for the front panel casting, and after the die has been held, molten plastic is injected into the die-casting cavities. After cooling within the metal mold, the die-casting is opened to take out the front panel 2 with the metal portion 7 partly inserted into the plastic portion 6.

The thus-produced front panel 2 has the form of a single unit consisting of the plastic portion 6 and the metal portion 7 of which the latter functions as the skeleton. The parts of the metal portion 7 which are inserted into the plastic portion 6 are the forward projections $9_3$ and $10_3$ and sideward projection $9_4$ of the left and right panels 9 and 10, part of the skirt panel 12, forward projections $12_1$ and $12_2$ and their margins. The front faces of the bent portions of these projections $9_3$, $10_3$, $12_1$ and $12_2$ are exposed, and the holes 9k, 10k, 12d and 12e are also exposed to the outside. Therefore, the front panel 2 is then assembled with the lens mount 14 by screw fasteners 17a, 17b, 17c and 17d which are threaded into the respective holes 9k, 10k, 12d and 12e. After that, the mirror drive mechanism unit, exposure control mechanism unit and automatic diaphragm unit (all of which are not shown) are to be assembled with the front panel 2. It should be pointed out that the attachment of the lens mount 14 along with the reinforcing plate 13 completes closed loops of metal in the metal portion 7 horizontally and vertically so that the mirror box is made to be of very rigid structure.

Next, to manufacture the camera body 1, the metal block 4 is first fitted in a metal mold for body die-casting. Then, after the mold is tightened, molten plastic is injected into the die-casting cavities. After being cooled within the metal mold, as the metal mold is opened, the body 1 with the metal block 4 inserted therein is extracted. Thus, the camera body 1 consisting of the metal block 4 as the basic support and the plastic portion 3 is obtained in a single unit form. Then, the camera body is assembled with a shutter unit (not shown).

Then, the camera body 1 is assembled with the front panel 2 is fixedly secured relation by the screw fasteners 15a, 15b, 16a, 16b, 16c and 16d. During this time, the holes 4a and 4b of the metal block of the camera body 1 are registered with the holes 12b and 12c of the skirt panel 12 of the metal portion 7 of the front panel 2 before the screw fasteners 15a and 15b are set. Also the holes 3a, 3b, 3c and 3d of the side wall $3_3$ of the camera body 1 are registered with the holes 9i, 9j, 10i and 10j of the projections $9_2$ and $10_2$ extending from the left and right panels 9 and 10 of the metal portion 7 of the front panel 2, before the screw fasteners 16a, 16b, 16c and 16d are set in. Thus, regardless of the fact that the side wall $3_3$ of the camera body 1 is part of the plastic portion 3, it stands sufficiently well against normal external pressure. That is, since the metal block 4 of the camera body 1 is coupled with the metal portion 7 of the front panel 2, as the metal block 4 constitutes another rigid metal box together with the rearward projections $9_2$ and $10_2$, the plastic side wall $3_3$ on such box is protected from damage when a strong force is applied to the camera body 1. Therefore, even when a heavy objective lens of long focal length is attached to the mount 14, excessive force is not exerted in the side wall $3_3$ of the camera body 1, and there is no possibility of occurrence of deformation of the side wall.

Thus, even the use of a plastic mold in the side wall of the camera body 1 can insure the strength of the camera body. At the same time, even with the lens mount attachment base $6_1$ of plastic in the front panel 2, the holes 9k, 10k, 12d and 12e of the projections $9_3$, $10_3$, $12_1$ and $12_2$ of the metal portion 7 are positioned in the front face of the lens mount attachment base $6_1$. This makes it possible to insure the precision accuracy of the flange back from the rail plane of the film guide to the lens attachment base or the mount surface.

Another advantage is that since the attachment of the plastic side wall $3_3$ of the camera body 1 to the projections $9_2$ and $10_2$ of the front panel 2 is effected by bringing the screw fasteners 16a, 16b, 16c and 16d from the downward direction of the top of the side wall $3_3$, the precision accuracy of the flange back can be maintained. That is, it is difficult to accurately maintain the plane of the four holes 9i, 9j, 10i and 10j exactly the same. Therefore, if the attachment of the front panel 2 to the side wall $3_3$ of the camera body 1 is effected not from the downward direction, but from a lateral direction, the tightening of the screw fastener often causes deflection of the side wall $3_3$. For this reason, in this embodiment, the attachment of the front panel 2 to the side wall of the camera body 1 is tightened from the downward direction.

If the camera body 1 and the front panel 2 are to be decorated in their surfaces, the use of the plastic molds of the invention is very advantageous, for this can be achieved merely by using a metal mold having engraved therein a corresponding negative pattern.

Though, in the above embodiment, the holes 9k, 10k, 12d and 12e of the projections $9_3$, $10_3$, $12_1$ and $12_2$ of the metal portion 7 of the front panel 2 are made exposed to the outside, that is not necessary. The front faces of these projections may be coated with a thin plastic layer, thereby giving an advantage in that when the accuracy of the flange back is required to be consistent, the machining of the necessary area becomes very easy. An additional advantage is that the residual plastic coating in the machined area can remove the necessity of the later corrosion resistance treatment.

As has been described in greater detail, according to the present invention, the mirror box is formed of metal by pressing means, and this metal portion is partly inserted into the plastic portion of the lens mount attachment base and wing form to provide a novel front panel. Therefore, there is no need of later application of machining operations as in the conventional single-unit structure, or of the otherwise necessary time-consuming and laborious assembling operation as in the conventional two-unit structure. Moreover, the weight can be made lighter by about 50% than when a zinc die-cast part is used.

Further, the backbone of the lens mount attachment base is formed by extending part of the metal of the mirror box so that the rigidity against the holding of the objective lens can be made almost equal to that of the conventional aluminum die-cast front panel. Again, the metal portion of the front panel when later supplemented by the reinforcing plate and the lens mount member provides a metal box-like structure which firmly reinforces the front panel. Moreover, since the metal portion of the front panel is configured to such a rigid box-like shape, the accuracy of the flange back can be insured despite the fact that the side wall of the camera body is made up of plastic by molding techniques, whereby the use of metal only in a portion of the bottom panel of the camera housing suffices. This makes it possible to remarkably reduce the weight of the camera body and also the production cost. Accordingly, the reduction of the weight and production cost of the front panel results in the production of a similar effect even on the remaining parts of the camera body subassembly. Therefore, regarding the camera housing as a whole, a great advantage can be expected.

A second embodiment of the present invention is next described by reference to FIGS. 6 to 10.

Figure 6:
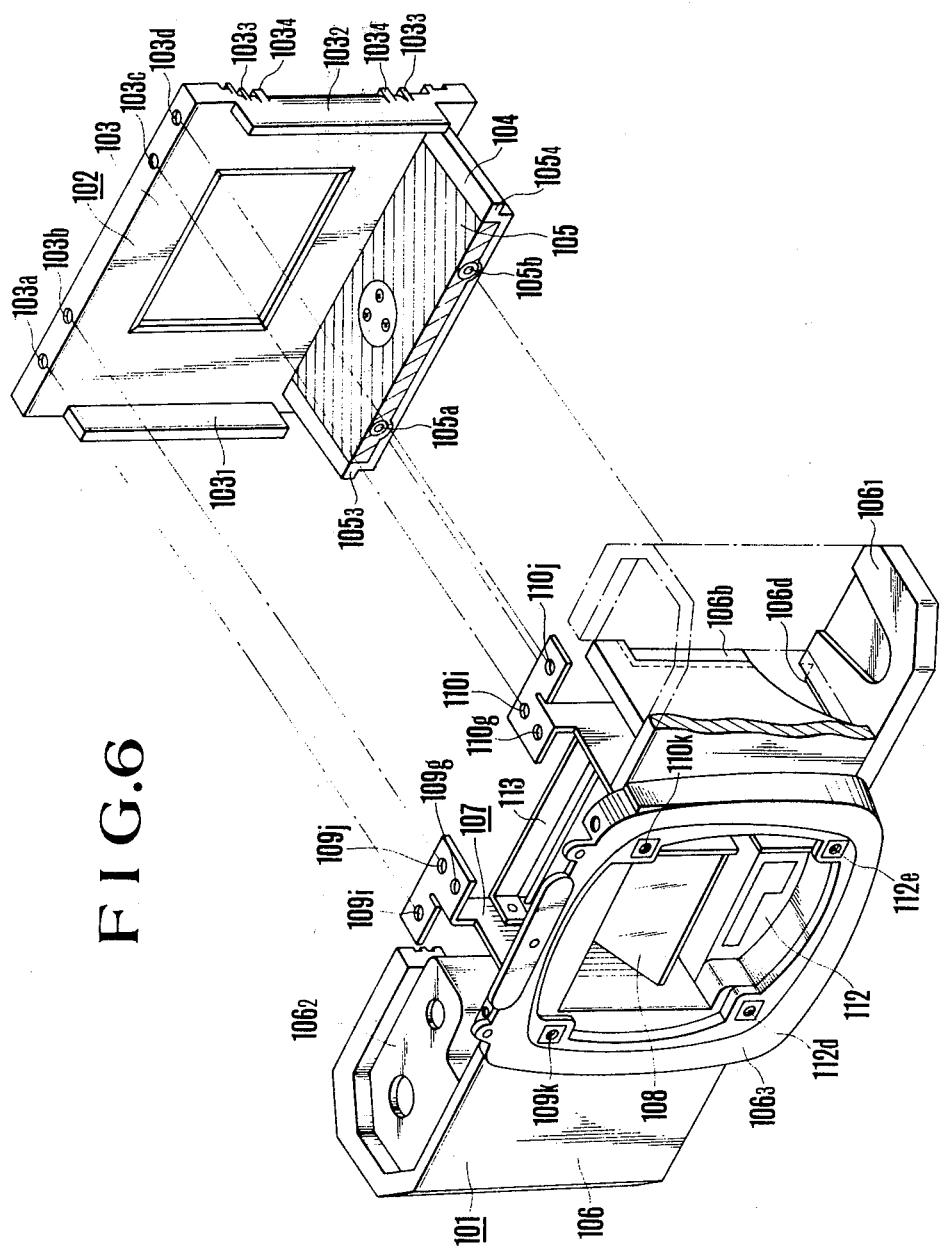
FIG. 6 is an exploded perspective view of a second embodiment of a camera body and a wall portion according to the present invention.
Figure 7:
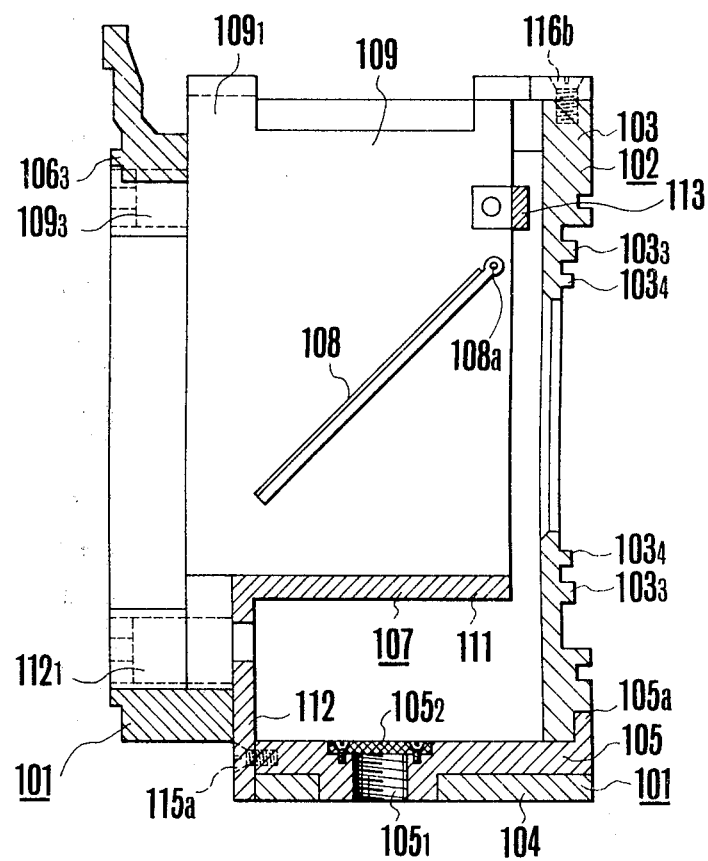
FIG. 7 is a longitudinal sectional view of the camera body and wall portion of FIG. 6 when assembled with each other.

FIG. 6 shows a camera body subassembly, wherein 101 is a camera body, and 102 is a wall portion to be attached to the camera body 101. This wall portion 102 is plastic-molded, comprising a side wall 103 and a bottom wall 104 bent out of the side wall 103. This side wall 103 has an aperture and is provided with light leak preventing brackets $103_1$ and $103_2$ at the right and left sides thereof, and a back surface portion of the side wall 103 is formed to rail surfaces provided with outer rails $103_3$ and inner rails $103_4$ as shown in FIG. 7. $103a$, $103b$, $103c$ and $103d$ are screw-threaded holes for attachment to the camera body 101 provided in the upper end surface of the side wall 103. 105 is a metal block inserted into the bottom wall 104, and the front end surface of this metal block 105 is provided with screw-threaded holes $105a$ and $105b$ for attachment to the camera body 101. This metal block 105 is not entirely covered, but a large proportion of the inner surface area is exposed, and a portion of the back surface area is exposed as shown in FIG. 7.

This exposed back surface portion of the metal block 105 has bored therein a tripod attachment screw hole $105_1$ as shown in FIG. 7. This tripod attachment screw hole $105_1$ is made to penetrate through the wall of the block in order to facilitate the making of the metal block 105, and is sealed at the inner end thereof by a cover $105_2$ in order to prevent inward projection of the tripod screw fastener. This cover $105_2$ is fixedly secured to the inner surface of the block 105 by screw fasteners. The metal block 105 is further provided with a flange $105a$ of short length which is projected into a portion of the side wall 103 in order to improve the intimateness of joinder with plastic and at the same time increase the rigidity. $105_3$ and $105_4$ are stepped portions for light leak prevention provided on the right and left sides of the bottom wall portion. Thus, the wall portion 102 has the metal block 105 as the basic support and is constructed from the metal portion and the plastic portion in a one-unit form.

Figure 8:
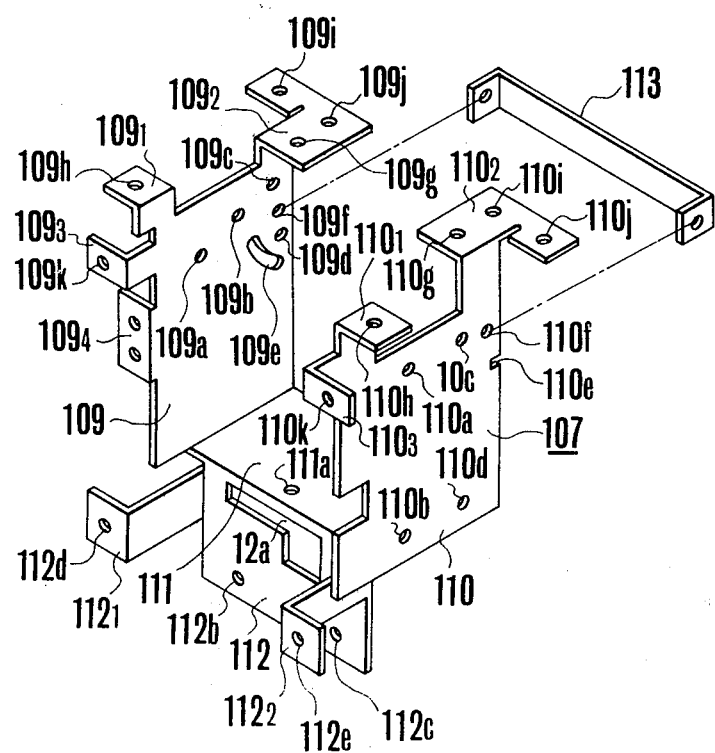
FIG. 8 is a perspective view of the metal portion of the camera body of FIGS. 6 and 7.
Figures 9, 10:
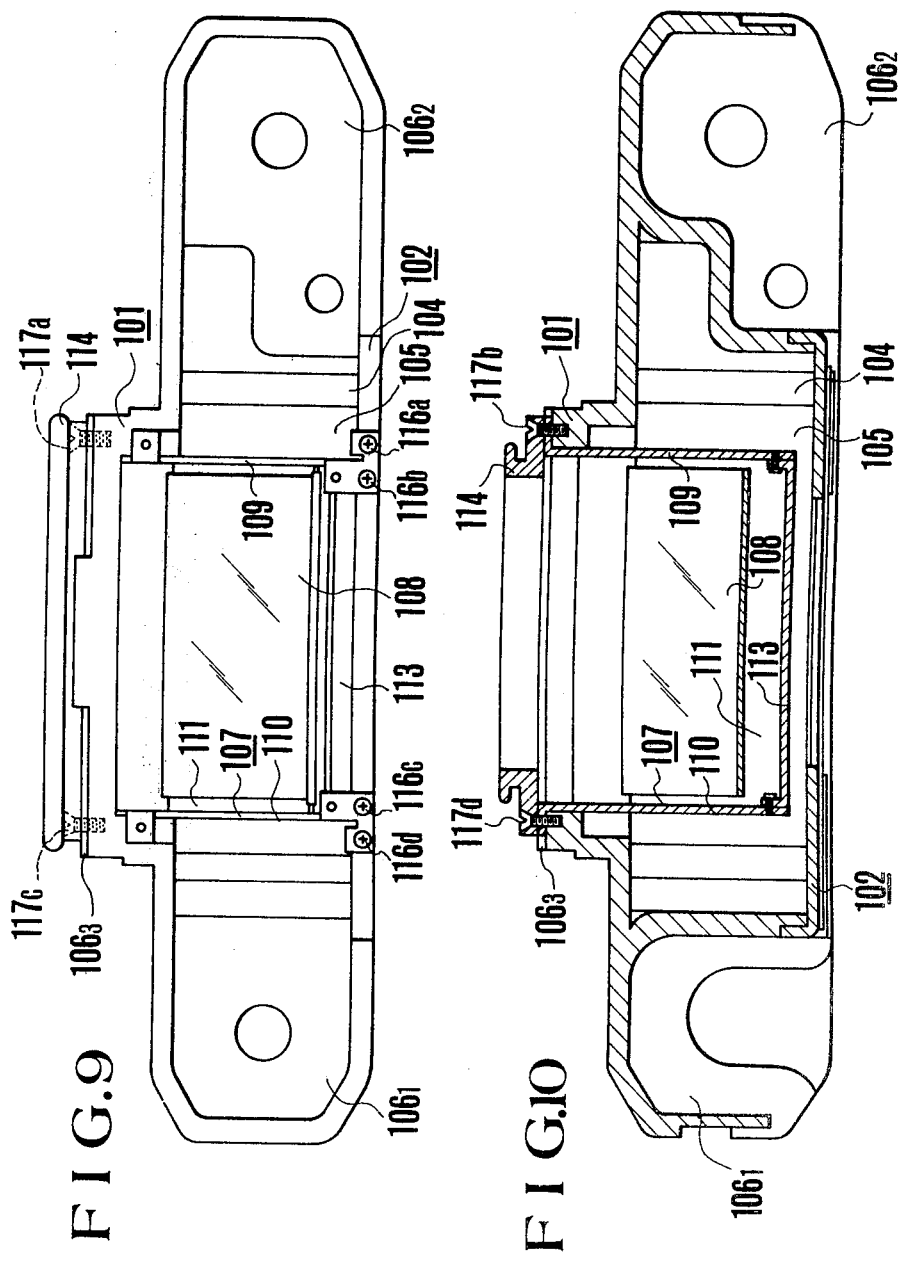
FIG. 9 is a top view of the camera body and wall portion of FIG. 6 when assembled with each other.
FIG. 10 is a lateral sectional view of the camera body and wall portion of FIG. 6 when assembled with each other.

In the camera body 101, 106 is a plastic portion constituting part of the camera body 101, and this plastic portion comprises a film cartridge chamber $106_1$, a film takeup chamber $106_2$ and a front panel portion $106_3$ between these chambers. The walls of the film cartridge chamber $106_1$ and film takeup chamber $106_2$ are provided with stepped portions $106b$ and $106a$ in which the brackets $103_1$ and $103_2$ of the wall portion 102 are to be fitted, and further with stepped portions $106c$ and $106d$ corresponding to the stepped portions $105_3$ and $105_4$ in the bottom portion thereof near the respective chambers. 107 is a metal portion forming a mirror box, part of which is inserted into the plastic portion 106. This mirror box contains a mirror 108. The metal portion 107 is made up by pressing a sheet of iron, aluminum or the like and is configured to a shape such as shown in FIG. 8. That is, the metal portion 107 comprises right and left side panels 109 and 110, a bottom panel 111, and a skirt panel 112 downwardly extending from the bottom panel 111. The side panel 109 has bored therein holes $109a$, $109b$ and $109c$ for attachment of a mirror drive mechanism unit (not shown), and the other side panel 110 has bored therein holes $110a$, $110b$, $110c$ and $110d$ for attachment of an exposure control mechanism unit (not shown). Also the bottom panel 111 has bored therein a hole $11a$ for attachment of an automatic diaphragm mechanism. Again, the first side panel 109 is further provided with an attachment hole $109d$ for a drive shaft $108a$ of the mirror 108 and a guide slot $109e$ for movement of the mirror 108, and the opposite side panel 110 with a cutout $110e$ for supporting the drive shaft $108a$ of the mirror 108. The right and left side panels 109 and 110 are further provided with holes $109f$ and $110f$ at which a reinforcing plate 113 of metal material is attached by caulking. This reinforcing plate 113 makes the metal portion of mirror box form more rigid. Both of the upper corners of the side panel 109 are provided with upwardly extending projections $109_1$ and $109_2$ of which the ends are rectangularly bent respectively. Both of the upper corners of the side panel 110 are also provided with upwardly extending projections $110_1$ and $110_2$ of which the ends are rectangularly bent respectively. In the bent end portions of these projections $109_1$, $109_2$, $110_1$ and $110_2$ there are provided screw-threaded holes $109g$, $109h$, $110g$ and $110h$ respectively for attachment of a finder unit (not shown). The bent end portions of the projections $109_2$ and $110_2$ are elongated toward the rear, and this elongated portion is each provided with screw fastener-fitted holes $109i$ and $109j$, or $110i$ and $110j$. These screw fastener-fitted holes $109i$, $109j$ $110i$ and $110j$ correspond ot the screw-threaded holes $103a$, $103b$, $103c$ and $103d$ provided in the upper end surface of the side wall of the wall portion 102. The skirt panel 112 is provided with a cutout $112a$ for a diaphragm closing down lever (not shown) and screw fastener-fitted holes $112b$ and $112c$ for screw-threaded coupling with the wall portion 102. These holes $112b$ and $112c$ correspond to the screw-threaded holes $105a$ and $105b$ of the metal block 105 of the wall portion 102 respectively. The skirt panel 112 is further provided with forward projections $112_1$ and $112_2$ of which the ends are rectangularly bent, while the aforesaid right and left side panels 109 and 110 are also further provided with forward projections $109_3$ and $110_3$ near the upward projections $109_1$ and $110_1$. These forward projections $109_3$ and $110_3$ are bent in their end portions. These bent end portions of the forward projections $109_3$, $110_3$, $112_1$ and $112_2$ are provided respectively with screw-threaded holes 109k, 110k, 112d and 112e for attachment of a lens mount 114 of metal as shown in FIGS. 9 and 10.

These screw-threaded holes 109k, 110k, 112d and 112e lie in a common plane, for the mount 114 is to be positioned thereon. The side panel 109 is provided with an apertured hook $109_4$ when inserted into and seated in the plastic portion 106 to improve the adhesion therewith.

It is to be understood that the camera body 101 is constructed from the metal portion 107 and the plastic portion 106 in a one-unit form with the metal portion 107 as the skeleton.

FIG. 7 in a vertical section view illustrates a subassembly of the camera body 101 and the wall portion 102. In this subassembly, the metal portion 107 of the camera body 101 is fixedly secured at its skirt board 112 to the metal block 105 of the wall portion 102 by screw fasteners 115a and 115b, of which there is shown only one in FIG. 7. The upward rear projections $109_2$ and $110_2$ of the side panels 109 and 110 of the camera body 101 too are fixedly secured to the upper end surface of the side wall 103 of the wall portion 102 by screw fasteners 116a, 116b, 116c and 116d shown in FIG. 9.

FIGS. 9 and 10 illustrate the attachment of a metal lens mount 114 to the exposed metal projections $109_3$, $110_3$, $112_1$ and $112_2$ of the metal portion 107 out of the mount attachment base of the front panel portion $106_3$ in fixedly secured relation by screw fasteners 117a, 117b, 117c and 117d.

In the process for manufacturing the camera body subassembly of such construction, beginning with the camera body 101, a thin plate of steel or aluminum is pressed with drilling operations for the holes 109a to 109k, 110a to 110k, 111a and 112a to 112e, an outline punching operation is performed and bending operations are performed for the side panels 109 and 110, skirt panel 112 and their projections $109_1$ to $109_4$, $110_1$ to $110_3$, $112_1$ and $112_2$ to form a metal portion of mirror box shape as shown in FIG. 8.

Then, while the reinforcing plate 113 is aligned with its holes provided in both the bent end portions to the holes 109f and 110f of the right and left side panels 109 and 110 of the metal portion 107, the reinforcing plate 113 is fixedly secured to the metal portion 107 by caulking or other suitable means such as welding, whereby the metal portion 107 of mirror box form is made more rigid.

Then, the metal portion 107 is set in a metal mold for the camera body die-casting, and after the mold has been tightened, molten plastic is injected into the die-casting cavities. After cooling within the metal mold, the metal mold is opened, and the camera body 101 with the metal portion 107 partly inserted is then extracted. The thus-produced camera body 101 has the form of one unit consisting of the plastic portion 106 and metal portion 107 wherein the latter functions as the basic supporting structure, as shown in FIG. 6. The parts of the metal portions 107 which are inserted into and seated in the plastic portion 106 are the forward projections $109_3$ and $110_3$ of the right and left side panels 109 and 110, the hook $109_4$, part of the skirt panel 112, the forward projections $112_1$, and $112_2$, and their surrounding parts. The front faces of the bent end portions of these projections $109_3$, $110_3$, $112_1$ and $112_2$ are exposed, and the mount attachment holes 109k, 110k, 112d and 112e too are exposed to the outside. Then, the mount 114 is fixedly secured to the camera body 101 by screw fasteners 117a, 117b, 117c and 117d threaded into these holes 109k, 110k, 112d and 112e. After that, a mirror drive mechanism unit, an exposure control mechanism unit and an automatic diaphragm mechanism unit (all of which are not shown) are successively joined at the respective holes. Then, a shutter unit is set in. For this reason, the metal portion 107 of the camera body 101 has to be imparted with a very rigid structure, as the addition of the reinforcing plate 113 along with the metal mount 114 establishes a closed loop of framework in the mirror box.

In the process for manufacturing the wall portion 102, the metal block 105 is first set in a metal mold for wall portion die-casting, and, after that mold has been tightened, a molten plastic is injected into the die-casting cavities. After cooling with the metal mold, the metal mold is opened, and the molded portion 102 is extracted. The thus-produced wall portion 102 has the form of one unit consisting of the plastic portion and the metal block 105 which latter functions as the basic support.

Subsequent thereto, such wall portion 102 is brought into fixedly secured relation to the aforesaid camera body 101. At this time, the right and left brackets $103_1$ and $103_2$ of the side wall 103 of the wall portion 102 are fitted in the stepped portions 106a and 106b of the plastic portion 106 of the camera body 101, and the flanged portions 106c and 106d of the wall portion 102 after having been slidingly moved are fitted in the stepped portions 106c and 106d of the plastic portion 106 of the camera body 101, whereby light leakage which would be otherwise caused through the juncture between the camera body 101 and wall portion 102 can be prevented. At the same time, the wall portion 102 after having been aligned with its holes 105a and 105b in the metal block 105 to the holes 112b and 112c of the skirt panel 112 of the metal portion 107 is fixedly secured to the camera body 101 by screw fasteners 115a and 115b. Also the holes 103a, 103b, 103c and 103d in the upper end surface of the side wall 103 of the wall portion 102 are aligned with the holes 109i, 109j, 110i and 110j in the upward projections $109_2$ and $110_2$ of the right and left side panels 109 and 110, and screw fasteners 116a, 116b, 116c and 116d are then threaded thereto. With this, despite the use of plastic in the side wall of the wall portion 102, a sufficient rigidity can be obtained. That is, since the metal portion 107 of the camera body 101 is combined with the metal block 105 of the wall portion 102, as such combination creates another box structure along with the metal portion 107, the plastic side wall 103 lying among the projections $109_2$ and $110_2$ and metal block 105 is made to assume the same condition as plastic which is positioned between the metal supports extending from the opposed sides of a very rigid metal box. Therefore, even when a strong pressure is applied to the box, excessive force is not exerted in the plastic. Accordingly, even when the mount 114 bears a heavy telephoto lens, the side wall 103 of the wall portion 102 does not endure much stress, and there is no possibility of occurrence of deformation of the side wall.

It will be appreciated that the plastic mold can be used in the side wall 103 of the wall portion 102 without sacrificing the assurance of the necessary rigidity of the camera housing, and that the simultaneous use of the plastic mold in the lens mount attachment base of the front panel $106_3$ of the camera body 101 is made possible without sacrificing the assurance of the accuracy of the flange back from the film guide rail plane to the lens mount plane, since the projections $109_3$, $110_3$, $112_1$ and $112_2$ of the metal portion 107 extend with their holes $109k$, $110k$, $112d$ and $112e$ at the front surface of the lens mount attachment base.

Another feature is that the attachment of the plastic side wall of the wall portion 102 to the projections $109_2$ and $110_2$ of the metal portion 107 of the camera body 101 is effected in such a direction that the screw fasteners $116a$, $116b$, $116c$ and $116d$ are placed from above to the upper end surface of the side wall 103 through the bent portions of the projections $109_2$ and $110_2$ of the metal portions 107 of the camera body 101. This gives rise to an advantage in that the accuracy of the flange back can be maintained. That is, it is difficult to set all the four holes $109i$, $109j$, $110i$ and $110j$ in exactly one and the same plane. Therefore, if the attachment of the wall portion 102 to the camera body 101 were effected not from the downward direction, but from a lateral direction, the tightening of the screw fasteners would cause deflection of the side wall 103. On this account, according to this embodiment, fixing of the camera body 101 with the wall portion 102 is carried out in the downward direction.

If decoration for the camera housing is necessary, all that is required is to engrave the inner surface of the metal mold to the corresponding negative pattern. In this point of view, the use of plastic molds is very advantageous.

Though, in the above embodiment, the holes $109k$, $110k$, $112d$ and $112e$ of the projections $109_3$, $110_3$, $112_1$ and $112_2$ of the metal portion 107 of the camera body 101 are made exposed to the outside, a modification may be made. For example, the front surfaces of these projections is coated with a thin plastic layer, thereby giving an additional advantage that when the accuracy of the flange back is required to be consistent, the machining of the necessary area becomes very easy. A further advantage is that the residual plastic coating in the machined area can remove the necessity of the later treatment for corrosion resistance.

As has been described in greater detail, according to the second embodiment of the invention, the mirror box is formed from metal by pressing means, and this metal portion of mirror box form is partly inserted into the plastic portion which constitutes the film cartridge chamber, film takeup chamber and the front panel therebetween, thus completing a camera body. Therefore, there is no need of later application machining and assembling operations of the front panel as in the prior art. Moreover, since there is no need for the use of metal except in a portion of the bottom panel of the camera housing, the total weight of the camera housing can be remarkably reduced, and the production cost is also lowered.

Further, the basic support of the lens mount attachment base is formed by extending part of the metal of the mirror box so that the rigidity against the pressure of holding the objective lens can be made almost equal to that of the conventional die-cast aluminum front panel. Again, the metal portion of the camera body when later supplemented by the reinforcing plate and the lens mount provides a metal box-like structure which firmly reinforces the camera body. Moreover, since the metal portion of the camera body is configured to a rigid box-like shape, the accuracy of the flange back can be insured despite the fact that the side wall of the wall portion is made up of plastic.

Next, a third embodiment of the present invention is described by reference to FIGS. 11 to 15.

Figure 11:
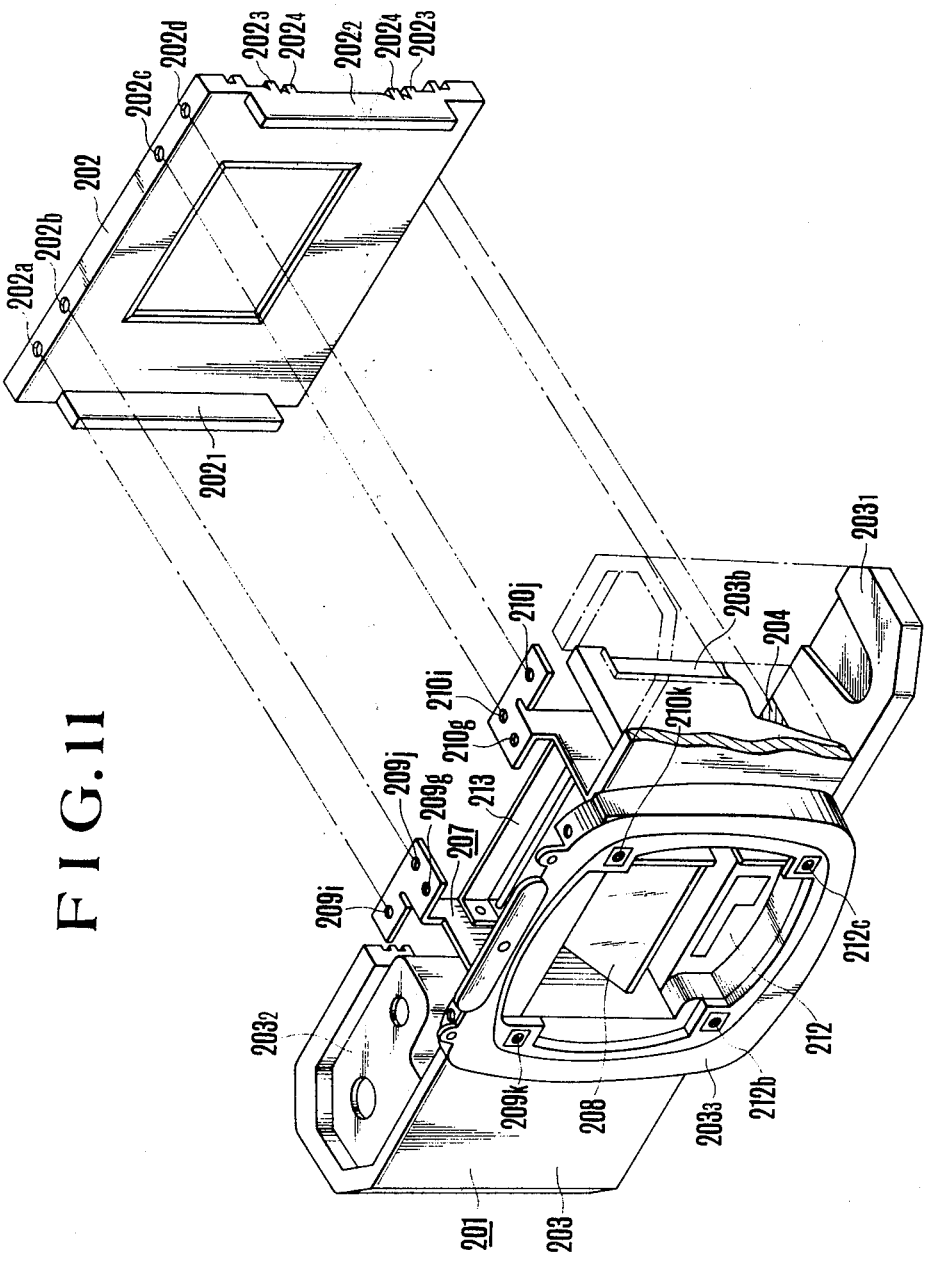
FIG. 11 is an exploded perspective view of a third embodiment of a camera body and a side wall plate according to the present invention.

FIG. 11 illustrates a camera body subassembly, wherein 201 is a camera body, and 202 is a side wall plate to be attached to the camera body 201. This side wall plate has an aperture, and is provided with right and left light leak preventing brackets $202_1$ and $202_2$. A portion of the back surface of this side wall plate 202 is formed to a rail surface with outer rails $202_3$ and inner rails $202_4$ as shown in FIG. 12. This side wall plate 202 is provided with screw-threaded holes $202a$, $202b$, $202c$ and $202d$ in the upper end surface thereof for attachment to the camera body 201, and with screw-threaded holes $202e$, $202f$, $202g$ and $202h$ also in the lower end surface thereof. This side wall plate 202 is all formed by plastic.

Figure 13:
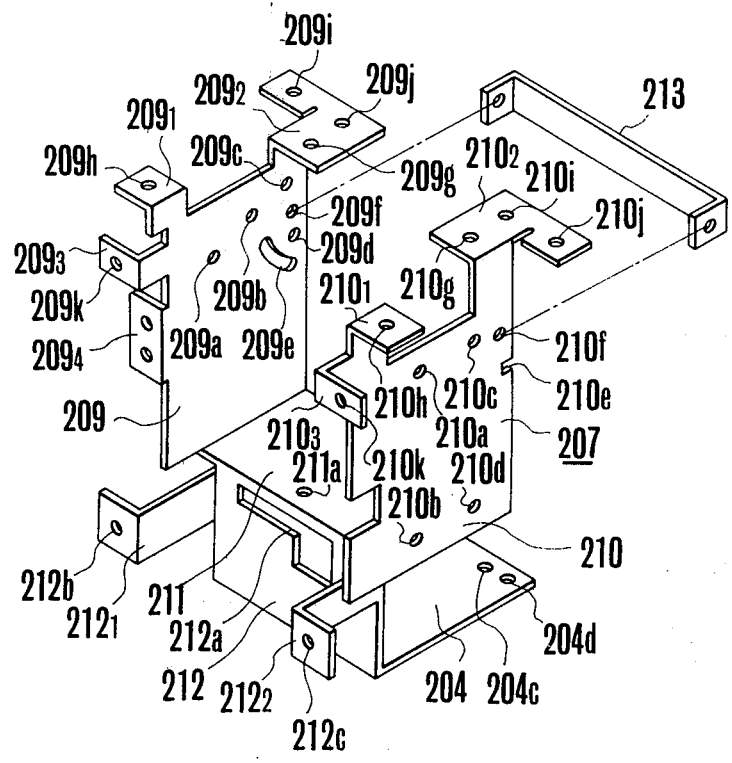
FIG. 13 is a perspective view of the metal portion of the camera body of FIGS. 11 and 12.

In the camera body 201, 203 is a plastic portion forming the camera body 201. This plastic portion comprises a film cartridge chamber $203_1$, a film takeup chamber $203_2$, and a front panel $203_3$ between these chambers. In the walls of the film cartridge chamber $203_1$ and the film cartridge chamber $203_2$ there are provided stepped portions $203b$ and $203a$ in which the aforesaid brackets $202_1$ and $202_2$ of the side wall plate 202 are to be fitted. 207 is a metal portion forming a mirror box and a bottom plate which are partly inserted into the plastic portion 203 in unison. This mirror box contains a mirror 208. The metal portion 207 is formed from a thin plate of iron, aluminum, or the like by pressing means and is configured to a shape as shown in FIG. 13. That is, the metal portion 207 comprises right and left side panels 209 and 210, a bottom plate 211, a downwardly bent portion 212 from the bottom plate 211, and a bottom wall 204 further bent from the portion 212 so as to be parallel with the bottom plate 211.

The side panel 209 has formed therein holes $209a$, $209b$ and $209c$ for attachment of a mirror drive mechanism unit (not shown), and the opposite side panel 210 has formed therein holes $210a$, $210b$, $210c$ and $210d$ for attachment of an exposure control mechanism unit (not shown). Also the bottom plate has formed therein a hole $211a$ for attachment of an automatic diaphragm mechanism unit (not shown). Again, the one side panel 209 is further provided with an attachment hole $209d$ for a drive shaft $208a$ of the mirror 208 and a guide slot $209e$ for movement of the mirror 208, and the opposite side panel 210 with a cutout $210e$ for supporting the drive shaft 208 of the mirror 108. The right and left side panels 209 and 210 are further provided with holes $209f$ and $210f$ at which a reinforcing plate 213 of metal material is attached by caulking. This reinforcing plate 213 makes the metal portion of mirror box form more rigid. Both of the upper corners of the side panel 209 are provided with upwardly extending projections $209_1$ and $209_2$ of which the ends are bent. Both of the upper corners of the side panel 210 are also provided with upwardly extending projections $210_1$ and $210_2$ of which the ends are bent. In the bent end portions of these projections $209_1$, $209_2$, $210_1$ and $210_2$ there are provided screw-threaded holes $209g$, $209h$, $210g$ and $210h$ respectively for attachment of a finder unit (not shown). The bent end portions of the projections $209_2$ and $210_2$ are elongated toward the rear, and there elongated portions are each provided with screw fastener-fitted holes $209i$ and $209j$, or $210i$ and $210j$. These screw-fastener fitted holes $209i$, $209j$, $210i$ and $210j$ correspond to the screw-threaded holes $202a$, $202b$, $202c$ and $202d$ provided in the upper end surface of the side wall plate 202 respectively. The bent portion 212 is provided with a cutout $212a$ for a diaphragm closing down lever (not shown). The end portion of the bottom wall 204 is provided with screw fastener-fitted holes $204a$, $204b$, $204c$ and $204d$ which correspond to the screw-threaded holes $202e$, $202f$, $202g$ and $202h$ provided in the lower end surface of the side wall plate 202 respectively. 205 is a tripod screw hole attached to the lower surface of the bottom wall 204 by screw fasteners. Both of the sides of the bent portion 212 are provided with forward projections $212_1$ and $212_2$ respectively of which the ends are rectangularly bent, while the aforesaid right and left side panels 209 and 210 are also provided with forward projections $209_3$ and $210_3$ near the aforesaid upward projections $209_1$ and $210_1$. These forward projections $209_3$ and $210_3$ have bent end portions. These bent end portions of the forward projections $209_3$, $210_3$, $212_1$ and $212_2$ are provided respectively with screw-threaded holes $209k$, $210k$, $212d$ and $212e$ for attachment of a lens mount 214. These screw-threaded holes $209k$, $210k$, $212d$ and $212e$ lie in a common plane, for the lens mount 214 is to be positioned thereon. The side panel 209 is provided with an apertured hook $209_4$ which when inserted into the plastic portion 203 will improve the adhesion therewith.

Thus, the camera body 201 is constructed from the metal portion 207 as the skeleton and the plastic portion 203 in the form of one unit, but a large proportion of the inner surface area of the bottom wall 204 of the metal portion 207 is exposed when inserted.

Now, FIG. 12 in a longitudinal sectional view illustrates a subassembly of the camera body 201 and the side wall plate 202. In this subassembly, the bottom wall 204 of the metal portion of the camera body 201 is fixedly secured to the side wall plate 202 at its lower end surface by screw fasteners $215a$, $215b$, $215c$ and $215d$, and the projections $209_2$ and $210_2$ of the metal portion 207 of the camera body 201 are also fixedly secured to the upper end surface of the side wall plate 202 by screw fasteners $216a$, $216b$, $216c$ and $216d$. Of these screw fasteners, there are shown the screw fasteners $215b$ and $216b$ in FIG. 12, and the screw fasteners $216a$, $216b$, $216c$ and $216d$ in FIG. 14.

FIGS. 14 and 15 in top plan and horizontal sectional views respectively illustrate the attachment of a metal lens mount 214 to the exposed metal projections $209_3$, $210_3$, $212_1$ and $212_2$ out of the mount attachment base of the front panel position $203_3$ in fixedly secured relation by screw fasteners $217a$, $217b$, $217c$ and $217d$.

In the process for manufacturing the camera body subassembly of such construction, beginning with the camera body 201, in the formation of the mirror box, a thin plate of steel or aluminum is pressed with drilling operations for the holes $209a$ to $209k$, $210a$ to $210k$, $211a$, $212a$ to $212c$ and $204a$ to $204d$, an outline punching operation is performed, and bending operations are performed for the side panels 209 and 210, front panel 212, bottom wall 204 and their projections $209_1$ to $209_4$, $210_1$ to $210_3$, $212_1$ and $212_2$ to form the shape shown in FIG. 13.

While the holes provided in both the end portions of the reinforcing plate 213 are aligned with the holes $209f$ and $210f$ of the right and left side panels 209 and 210 of the metal portion 207, the reinforcing plate 213 is then fixedly secured to the metal portion 207 by caulking or by other suitable means such as welding whereby the structure of the metal portion 207 of mirror box form is made more rigid.

Then, the metal portion 207 of mirrox box form is set in a metal mold for camera body die-casting, and, after the mold has been tightened, molten plastic is injected into the die-casting cavities. After being cooled within the metal mold, the metal mold is opened, and the molded camera body 201 with the metal portion 207 partly inserted into the plastic portion is then extracted. The thus obtained camera body 201 has the form of one unit consisting of the plastic portion 203 and metal portion 207 which latter functions as the skeleton, as shown in FIG. 11. The parts of the metal portion 207 which are inserted into the plastic portion 203 are the forward projections $209_3$ and $210_3$ of the right and left side panels 209 and 210, the hook $209_4$, part of the bent portion 212, the forward projections $212_1$ and $212_2$, and their surrounding parts. The front faces of the bent end portions of these projections $209_3$, $210_3$, $212_1$ and $212_2$ are exposed, and the mount attachment holes $209k$, $210k$, $212d$ and $212e$ too are exposed to the outside. Then the lens mount 214 is fixedly secured to the camera body 201 by screw fasteners $217a$, $217b$, $217c$ and $217d$ threaded into these holes $209k$, $210k$, $212d$ and $212e$. After that, a mirror drive mechanism unit, and exposure control mechanism unit and an automatic diaphragm mechanism unit (all of which are not shown) are successively joined at the respective holes. Then, a shutter unit is set in. For this reason, the metal portion 207 of the camera body 201 has to be imparted with a very rigid structure, as the addition of the reinforcing plate 213 along with the metal mount 214 establishes a closed loop framework in the mirror box.

In the process for producing the side wall plate 202 first, a metal mold after having been tightened is injected with molten plastic. After being cooled within the metal mold, the metal mold is opened, and the molded side wall plate 202 is extracted. Thus, the plastic-molded side wall plate 202 is obtained.

Subsequent thereto, the side wall plate 202 is brought into fixedly secured relation to the aforesaid camera body 201. At this time, the right and left brackets $202_1$ and $202_2$ of the side wall plate 202 are light-tightly fitted in the stepped portions $203a$ and $203b$ of the plastic portion 203 of the camera body 201, whereby light leakage which would be otherwise caused to occur through the juncture between the camera body 201 and the side wall plate 202 can be prevented.

Then, the bottom wall 204 of the metal portion 207 of the camera body 201 is fixedly secured to the bottom end surface of the side wall plate 202 by screw fasteners $215a$, $215b$, $215c$ and $215d$ threaded through the holes $204a$, $204b$, $204c$ and $204d$ to the holes $202e$, $202f$, $202g$ and $202h$. Then, the rear upward projections $209_2$ and $210_2$ of the right and left side panels 209 and 210 of the metal portion 207 of the camera body 201 are also fixedly secured to the upper end surface of the side wall plate 202 by screw fasteners $216a$, $216b$, $216c$ and $216d$ threaded through the holes $209i$, $209j$, $210i$ and $210j$ to the holes $202a$, $202b$, $202c$ and $202d$. With this, despite the use of plastic in the side wall plate 202, a sufficient rigidity can be obtained. That is, since the metal portion 207 of the camera body 201 is combined with the side wall plate 202, as such combination results in positioning the side wall plate 202 between the metal supports extending from the opposed sides of a very rigid metal box, even when a strong pressure is applied to the box, excessive force is not exerted in the plastic side wall plate 202. Accordingly, even when the mount 214 bears a heavy telephoto lens, the side wall plate 202 does not endure excessive stress, and there is no possibility of occurrence of deformation of the side wall plate 202. Regardless of the fact that the side wall plate 202 is plastic-molded, sufficient rigidity of the camera body can be insured. At the same time, regardless of the fact that the lens mount attachment base of the front panel is plastic-molded, the forward projections $209_3$, $210_3$, $212_1$ and $212_2$ of the metal portion 207 extend therethrough so that their holes $209k$, $210k$, $212b$ and $212c$ reveal themselves in the front surface of the lens mount attachment base. As a result, the accuracy of the flange back from the film guide rail surface to the mount surface of the lens mount attachment base can be insured.

Further, when the side wall plate 202 is to be attached to the camera body 201, it is in upward and downward directions to the lower and upper end surfaces of the side wall plate 202 that the screw fasteners $216a$, $216b$, $216c$, $216d$ $215a$, $215b$, $215c$ and $215d$ are oriented. Therefore, when the projections $209_2$ and $210_2$ and the bottom wall 204 of the metal portion 207 of the camera body 201 are firmly tightened, the accuracy of the flange back can be maintained. That is, it is difficult to set all the upper or lower holes $209i$, $209j$, $210i$ and $210j$, or $204a$, $204b$, $204c$ and $204d$ of the metal portion 207 of the camera body 201 in exactly one and the same plane. Therefore, if the tightening of the side wall plate 202 to the camera body 201 is not effected from the upward and downward directions, the side wall plate 202 will often be deflected. On this account, according to the present embodiment, fixing of the side wall plate 202 to the camera body 201 is performed not from the lateral directions, but from the vertical directions.

If decoration for the outer surface of the camera housing is necessary, all that must be done is to engrave the inner surface of the metal mold to the corresponding negative pattern. From this point of view, the use of plastic molds according to the present invention is very advantageous.

Though, in the above embodiment, the holes $209k$, $210k$, $212b$ and $212c$ of the projections $209_3$, $210_3$ $212_1$ and $212_2$ of the metal portion 207 of the camera body 201 are made exposed to the outside, such may be otherwise modified. For example, the front surfaces of these projections is coated with a thin plastic layer, thereby giving an additional advantage that when the accuracy of the flange back is required to be consistent, the machining of the necessary area becomes very easy, and at the same time the residual plastic coating in the machined area can remove the necessity of the later treatment for corrosion resistance.

As has been described in greater detail, according to the present invention, the mirror box and bottom wall are formed from metal by pressing means, and this metal portion is partly inserted into the plastic portion which constitutes the film carriage chamber, film takeup chamber and the front panel therebetween, thus completing a camera body. Therefore, there is no need of later application of machining and assembling operations of the front panel as in the prior art. However, since the combination of the side wall plate with the camera body operates to construct the camera housing, all metallic parts of the camera housing can be formed as one skeletal article with the advantage that the structure can be simplified, and the weight of the camera housing as a whole is remarkably reduced, and the production cost is also lowered.

Further, the basic support of the lens mount attachment base is formed by extending part of the metal of the mirror box so that the rigidity against the pressure of holding the lens can be made almost equal to that of the conventional die-cast aluminum front panel. Again, the metal portion of the camera body when later supplemented by the reinforcing plate and the lens mount provides a metallic box-like structure which firmly reinforces the camera body. Moreover, since the metal portion of the camera body is configured to a rigid box-like shape, the accuracy of the flange back can be insured despite the fact that the side wall plate is made up of plastic.

While specific embodiments of the invention have been shown and described in detail to illustrate the application of the inventive principles, it will be understood that the invention may be embodied otherwise without departing from such principles.

What is claimed is:

1. A single lens reflex camera assembly comprising:
   a camera main body formed of plastic material structured to define
   a film cartridge chamber,
   a film take-up chamber,
   a side wall portion having an aperture therethrough, and
   an attachment portion;
   a mirror box made of metal having
   a mount attachment portion and
   a complementary attachment portion formed in correspondence with said attachment portion of said camera main body;
   a front panel of plastic material formed with a lens mount attachment base for attachment of a phototaking lens and wings, said front panel being integrally formed with said mirror box with a portion of said mirror box adjacent said mount attachment portion thereof being inserted into said lens mount attachment base of said front panel in a manner such that mount attachment portion is exposed; and
   assembly means joining together said complementary attachment portion of said mirror box and said attachment portion of said camera main body, said assembly means coupling said front panel with said camera main body.

2. A camera assembly according to claim 1 wherein a metal block is inserted into said bottom wall of said camera main body and wherein a part of said attachment portion is provided at said metal block, said metal block being assembled with said mirror box by said assembly means thereby to form a frame of said camera assembly.

3. A camera assembly according to claim 1 wherein said mirror box further includes left and right side panels, a bottom panel, and a bent piece which is bent from said bottom panel, wherein said panels and said bent piece are formed by a press process with portions for attachment thereof with said camera main body being provided at upper ends of said left and right side panels and at a forward end of said bent piece.

4. A camera assembly according to claim 3 wherein said mirror box has a reinforcing panel provided between said left and right side panels.

5. A camera assembly according to claim 3 wherein part of said attachment portion of said camera main body is provided at crest parts of said side walls of said camera main body.

6. A camera assembly according to claim 3 wherein said mirror box includes additional attachment portions for various internal mechanisms of said camera assembly.

7. A single lens reflex camera assembly comprising:
a mirror box made of metal having an attachment portion and a mount attachment portion;
a camera main body formed of plastic material and structured to define a film cartridge chamber, a film take-up chamber, and a front wall connecting said film cartridge and film take-up chambers, said front wall having a lens mount base for a photo-taking lens with a part near said mount attachment portion of said mirror box being inserted into said mount base for said photo-taking lens in a manner such that said mount attachment portion of said mirror box is exposed thereby forming said mirror box integrally with said camera main body;
wall means formed of plastic material including a side wall provided with an aperture, a bottom wall and a complementary attachment portion corresponding to said attachment portion of said mirror box; and
assembly means for joining said attachment portion of said mirror box which is integrally formed with said camera main body and said complementary attachment portion of said wall means, said assembly means coupling said wall means with said camera main body.

8. A camera assembly according to claim 7 wherein said wall means includes a metal block inserted into said bottom wall, with a part of said complementary attachment portion being provided at said metal block, wherein said metal block is assembled with said mirror box by means of an assembly arrangement which forms a frame for said camera together with said mirror box.

9. A single lens reflex camera assembly comprising:
a mirror box made of metal material and including an attachment portion and a mount attachment portion;
a camera main body formed of plastic material structured to define a film cartridge chamber, a film take-up chamber, a front wall and a bottom wall connecting said chambers, and an attachment portion, said front wall having a lens mount base for a photo-taking lens with a part of said mirror box near said mount attachment portion being inserted into said lens mount base for said photo-taking lens in a manner wherein said mount attachment portion of said mirror box is exposed thereby forming said mirror box integrally with said camera main body;
wall means formed of plastic material having an aperture and a complementary attachment portion at positions respectively corresponding to said attachment portion of said camera main body and said attachment portion of said mirror box which is inserted into said camera body; and
assembly means for joining said attachment portion of said mirror box which is integrally formed with said camera main body and said complementary attachment portion of said wall means, said assembly means joining said wall means with said camera main body.

10. A camera according to claim 9 wherein said camera main body includes a metal block inserted thereinto with a part of said attachment portion of said mirror box being provided therein, said metal block being attached to said mirror box by said assembly means thereby forming a frame for said camera assembly together with said mirror box.

* * * * *